United States Patent
Lee et al.

(10) Patent No.: US 11,160,119 B2
(45) Date of Patent: Oct. 26, 2021

(54) METHOD FOR REQUESTING AN UPLINK RESOURCE IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG Electronic Inc., Seoul (KR)

( * ) Notice: Subject to any disclaimer, the term of this patent is extended or adjusted under 35 U.S.C. 154(b) by 46 days.

(21) Appl. No.: 16/625,637

(22) PCT Filed: Jun. 18, 2018

(86) PCT No.: PCT/KR2018/006847
§ 371 (c)(1),
(2) Date: Dec. 20, 2019

(87) PCT Pub. No.: WO2018/236108
PCT Pub. Date: Dec. 27, 2018

(65) Prior Publication Data
US 2020/0163122 A1    May 21, 2020

Related U.S. Application Data

(60) Provisional application No. 62/522,607, filed on Jun. 20, 2017.

(51) Int. Cl.
*H04W 74/08*    (2009.01)
*H04W 72/02*    (2009.01)
*H04W 72/12*    (2009.01)
*H04W 80/02*    (2009.01)

(52) U.S. Cl.
CPC ....... *H04W 74/0833* (2013.01); *H04W 72/02* (2013.01); *H04W 72/1268* (2013.01); *H04W 80/02* (2013.01)

(58) Field of Classification Search
None
See application file for complete search history.

(56) References Cited

U.S. PATENT DOCUMENTS

2015/0043547 A1   2/2015  Pelletier et al.
2016/0066328 A1*  3/2016  Hu ................... H04W 72/1242
                                                370/329

OTHER PUBLICATIONS

Huawei "SR signaling content in NR" May 2017 section 2.1-2.2 (Year: 2017).*
PCT International Application No. PCT/KR2018/006847, International Search Report dated Sep. 27, 2018, 3 pages.
(Continued)

*Primary Examiner* — Ayanah S George
(74) *Attorney, Agent, or Firm* — Lee, Hong, Degerman, Kang & Waimey

(57) ABSTRACT

The present invention relates to a wireless communication system. More specifically, the present invention relates to a method and a device for configuring multiple logical channels; triggering a scheduling request (SR) associated with a first logical channel of the multiple logical channels; and if there is no SR resource corresponding to the first logical channel and if there is no on-going SR transmission on an SR resource corresponding to a second logical channel, initiating a random access procedure.

6 Claims, 10 Drawing Sheets

(56) References Cited

OTHER PUBLICATIONS

Huawei et al., "SR triggering and cancellation," 3GPP TSG-RAN WG2 #98, R2-1705198, Hangzhou, China, May 15-19, 2017, 3 pages.
MediaTek Inc., "SR/BSR design for multiple numerology," 3GPP TSG-RAN WG2 #98, R2-1704946, Hangzhou, China, May 15-19, 2017, 3 pages.
Ericsson, "SR signalling content in NR," 3GPP TSG-RAN WG2 #98, R2-1704375, Hangzhou, China, May 15-19, 2017, 3 pages.
NTT Docomo, Inc., "Scheduling request design in NR system," 3GPP TSG RAN WG1 Meeting #89, R1-1708480, Hangzhou, China, May 15-19, 2017, 3 pages.

* cited by examiner

【Figure 1】
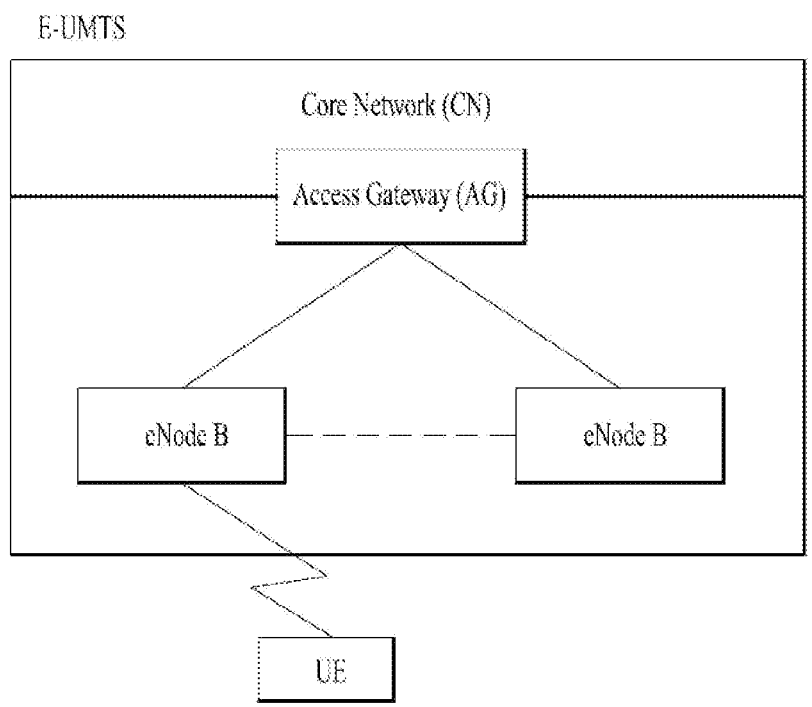

【Figure 2A】
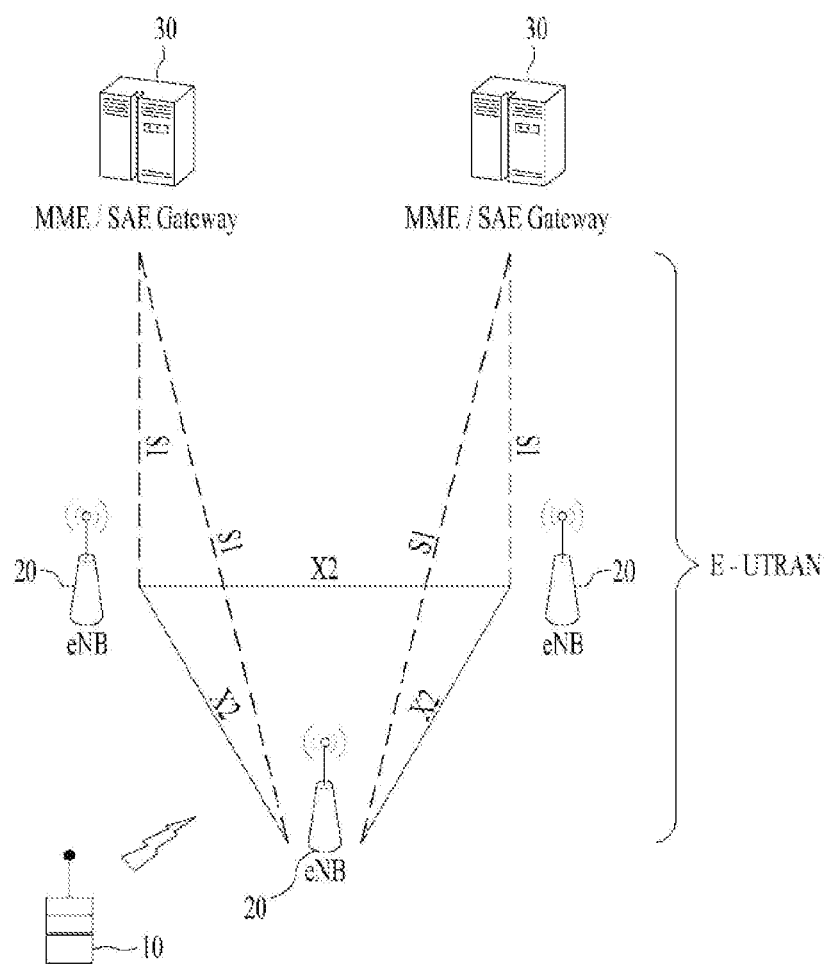

【Figure 2B】
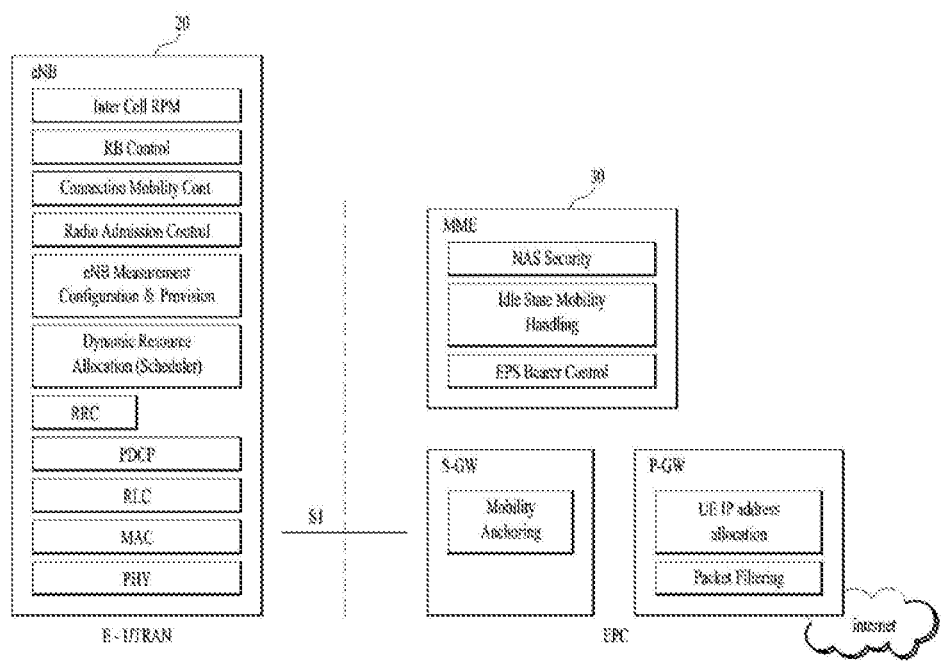

【Figure 3】
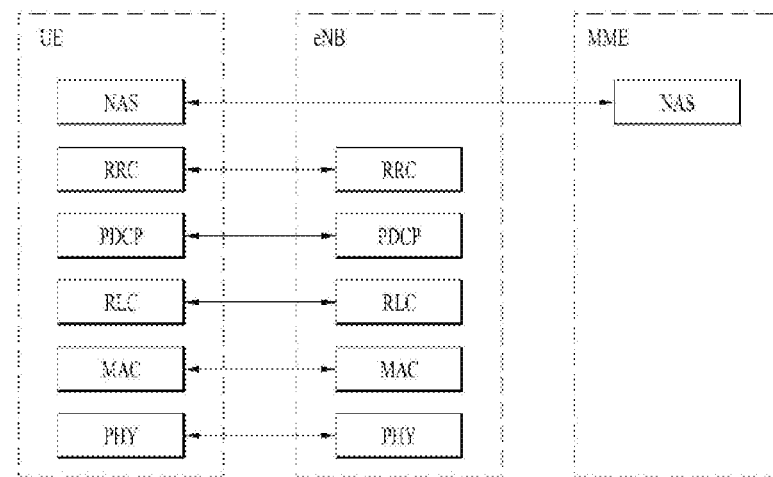
(a) Control-Plane Protocol Stack
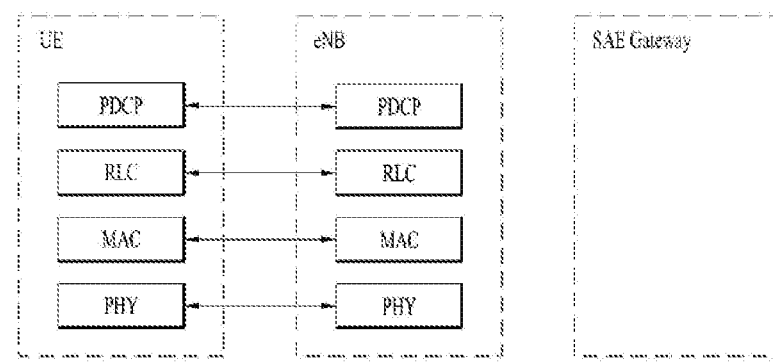
(b) User-Plane Protocol Stack 【Figure 4A】
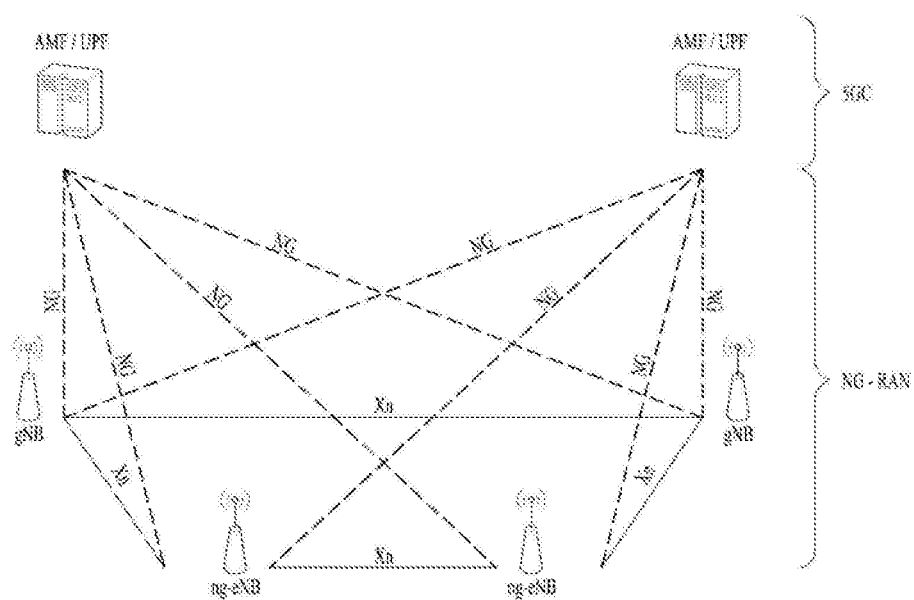

【Figure 4B】
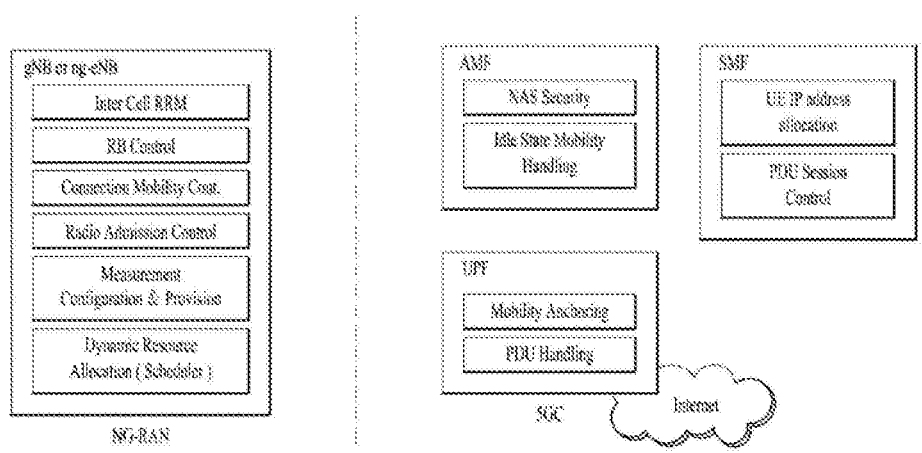

【Figure 5】
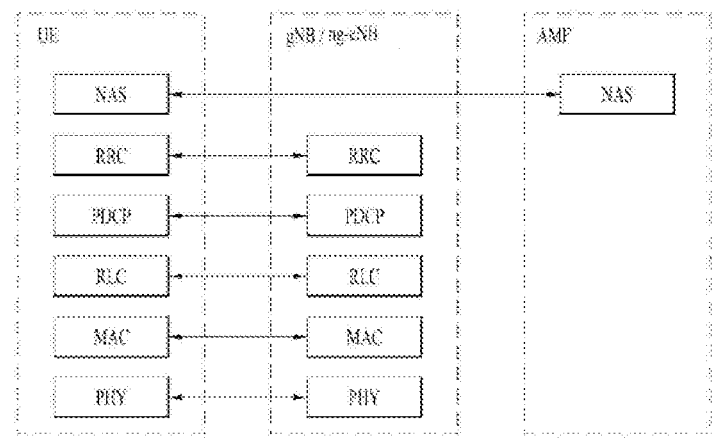
(a) Control-Plane Protocol Stack
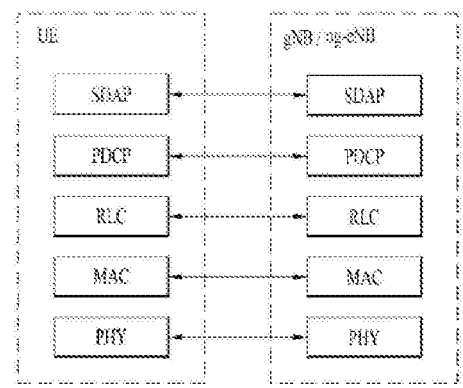
(b) User-Plane Protocol Stack
【Figure 6】
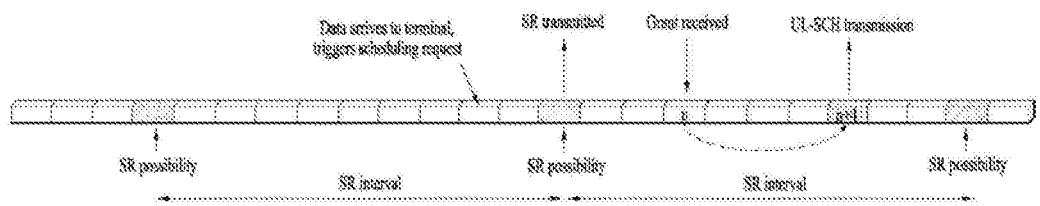

【Figure 7】
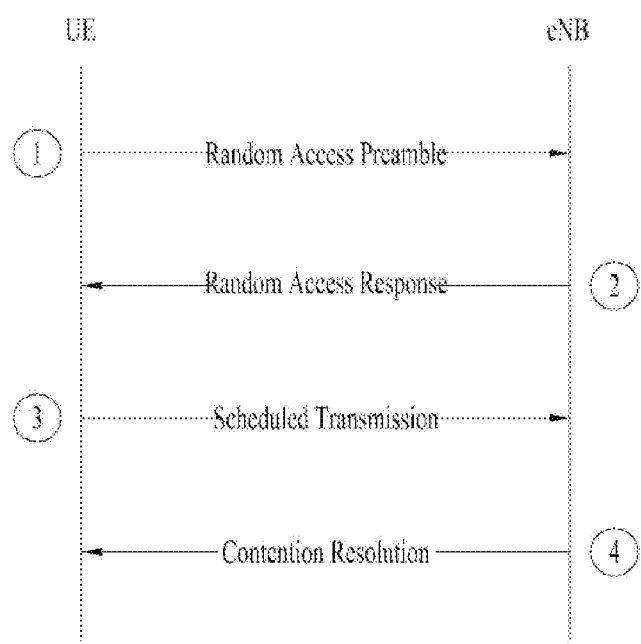

【Figure 8】
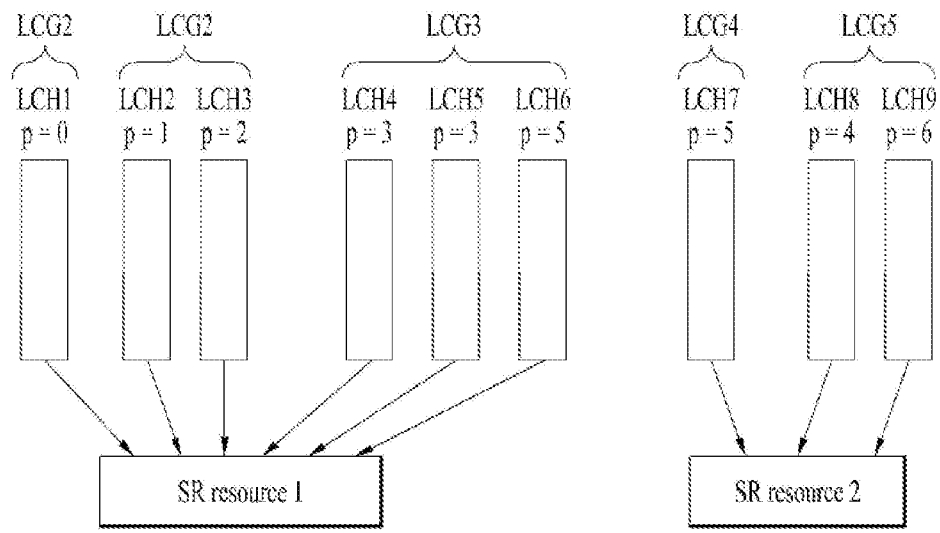
【Figure 9】
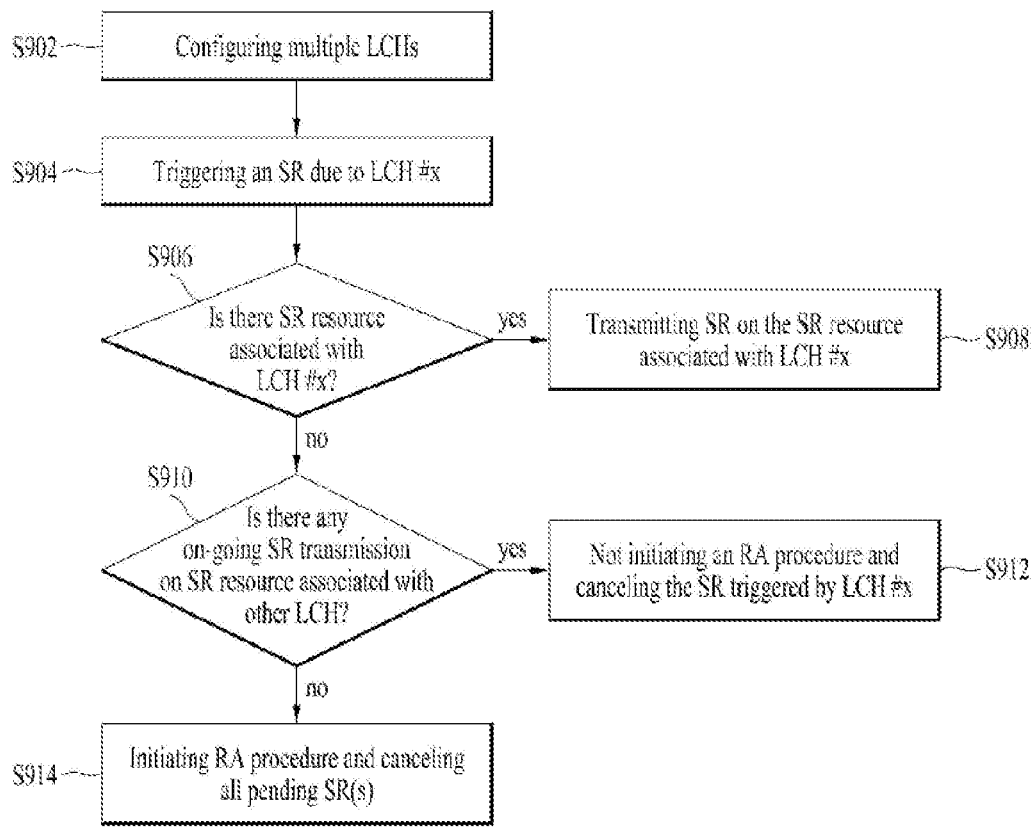

【Figure 10】
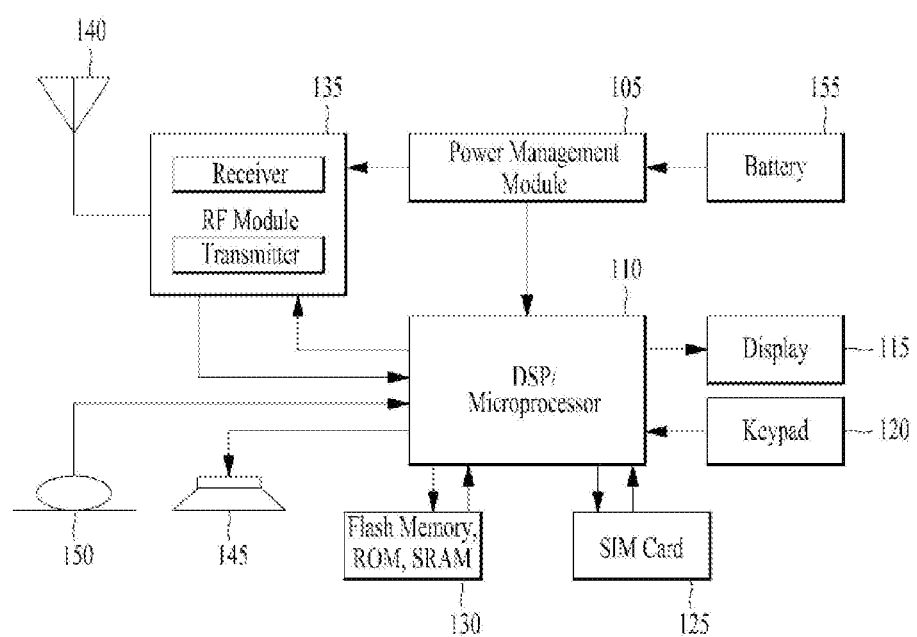

METHOD FOR REQUESTING AN UPLINK RESOURCE IN A WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/006847, filed on Jun. 18, 2018, which claims the benefit of U.S. Provisional Application No. 62/522,607, filed on Jun. 20, 2017, the contents of which are all hereby incorporated by reference herein in their entirety.

TECHNICAL FIELD

The present invention relates to a wireless communication system and, more particularly, to a method for requesting an uplink resource (e.g., Uplink Shared Channel (UL-SCH) resource) in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an Evolved Universal Mobile Telecommunications System (E-UMTS) as an exemplary radio communication system. The E-UMTS is an advanced version of a conventional Universal Mobile Telecommunications System (UMTS) and basic standardization thereof is currently underway in the 3GPP. E-UMTS may be generally referred to as a Long Term Evolution (LTE) system. The communication network is widely deployed to provide a variety of communication services such as voice (VoIP) through IMS and packet data.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE and NR based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention is to provide a method and device for efficiently requesting an uplink resource (e.g., UL-SCH resource) in a wireless communication system.

The technical problems solved by the present invention are not limited to the above technical problems and those skilled in the art may understand other technical problems from the following description.

Technical Solution

As an aspect of the present invention, a method for a user equipment to request uplink resource in a wireless communication system is provided, wherein the method comprises: configuring multiple logical channels; triggering a Scheduling Request (SR) associated with a first logical channel of the multiple logical channels; and if there is no SR resource corresponding to the first logical channel and if there is no on-going SR transmission on an SR resource corresponding to a second logical channel, initiating a random access procedure.

As another aspect of the present invention, a User Equipment (UE) for operating in a wireless communication system is provided, wherein the UE comprises: a Radio Frequency (RF) module; and a processor operably coupled with the RF module and configured to: configure multiple logical channels, trigger a Scheduling Request (SR) associated with a first logical channel of the multiple logical channels, and if there is no SR resource corresponding to the first logical channel and if there is no on-going SR transmission on an SR resource corresponding to a second logical channel, initiate a random access procedure.

Preferably, all pending SR(s) may be canceled when the random access procedure is initiated.

Preferably, the first logical channel may have no mapped SR resource, and the second logical channel has a mapped SR resource.

Preferably, if there is no SR resource corresponding to the first logical channel but if there is any on-going SR transmission on the other SR resource, the any on-going SR transmission may be maintained on the other SR resource, without initiating the random access procedure.

Preferably, the SR resource may include a physical uplink control channel (PUCCH) resource.

Preferably, if there is an SR resource corresponding to the first logical channel, an SR may be transmitted using the SR resource corresponding to the first logical channel.

Advantageous Effects

According to the present invention, an uplink resource (e.g., UL-SCH resource) can be efficiently requested in a wireless communication system.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4A is a block diagram illustrating network structure of NG Radio Access Network (NG-RAN) architecture, and FIG. 4B is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIG. 6 is a diagram for Scheduling-request transmission;

FIG. 7 is a diagram showing a contention-based random access procedure;

FIG. 8 is an example of a mapping between logical channels and SR resources;

FIG. 9 shows an example for requesting uplink resource in a wireless communication system according to embodiments of the present invention; and FIG. 10 is a block diagram of a communication apparatus according to an embodiment of the present invention.

MODE FOR INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Hereinafter, explanations on an uplink resource request is described. A scheduler (e.g., gNB) needs knowledge about the amount of data awaiting transmission from UEs to assign proper amounts of uplink resources. Obviously, there is no need to provide uplink resources to an UE with no data to transmit. Hence, the scheduler needs to know whether the UE has data to transmit and should be given a grant.

To this end, Buffer Status Reporting (BSR) procedure is used. The BSR provides a serving gNB with information about an amount of data available for transmission in UL buffer(s), for example, associated with an MAC entity. Specifically, a regular BSR may be triggered if at least the following event occur:

UL data, for a logical channel which belongs to a Logical Channel Group (LCG), becomes available for transmission in an RLC entity or in an PDCP entity and either the UL data belongs to a logical channel with higher priority than the priorities of the logical channels which belong to any LCG and for which UL data is already available for transmission, or there is no data available for transmission for any of the logical channels which belong to a LCG, retxBSR-Timer expires and the MAC entity has data available for transmission for any of the logical channels which belong to a LCG.

The MAC entity restarts retxBSR-Timer upon indication of a grant for transmission of new data on any UL-SCH.

If the BSR procedure determines that at least one regular BSR has been triggered and not canceled and if the MAC entity doesn't have enough UL resources allocated for new transmission for this TTI, a Scheduling Request (SR) is triggered. The SR is used for requesting uplink resources (e.g., UL-SCH resource) for new transmission. If the MAC entity has enough UL resources for new transmission, the MAC entity generates a MAC PDU including pending BSR(s) and transmits the generated MAC PDU to the gNB. From a scheduling perspective, buffer information for each logical channel is beneficial, although this could result in a significant overhead. So, logical channels are therefore grouped into Logical Channel Groups (LCGs) and the BSR is done per group. The buffer-size field in a BSR indicates an amount of data awaiting transmission across all logical channels in a LCG.

FIG. 6 is a diagram for scheduling request transmission.

When data with higher priority than already existing in the UE buffers arrives at the UE (e.g., BSR is triggered) and the UE has no grant and hence cannot transmit the data, the UE triggers a SR. If a MAC entity has valid PUCCH resource for SR configured in any TTI, the UE transmits the SR through a PUCCH using the valid PUCCH resource at a next possible instant, as illustrated in FIG. 6. Upon reception of the SR, a scheduler (e.g., gNB) can assign an uplink grant for new transmission to the UE. If the UE does not receive an uplink grant until the next possible SR instant, then the SR is repeatedly transmitted through a PUCCH using the valid PUCCH resource. If a MAC entity has no valid PUCCH resource for SR configured in any TTI, the UE initiates a Random Access procedure (see, FIG. 7).

One or more valid PUCCH resources for SR are configured per MAC entity (i.e., the same PUCCH resource(s) is commonly configured for all logical channels in an MAC entity) based on a SR configuration of the gNB.

Table 1 shows an example of the SR configuration.

TABLE 1

```
SchedulingRequestConfig ::= CHOICE {
    release                    NULL,
    setup                      SEQUENCE {
        sr-PUCCH-ResourceIndex      INTEGER (0..2047),
        sr-ConfigIndex              INTEGER (0..157),
        dsr-TransMax                ENUMERATED {
            n4, n8, n16, n32, n64, spare3, spare2, spare1}
    }
}
SchedulingRequestConfigSCell-r13 ::= CHOICE {
    release                    NULL,
    setup                      SEQUENCE {
        sr-PUCCH-ResourceIndex-r13  INTEGER (0..2047),
        sr-ConfigIndex-r13          INTEGER (0..157),
        dsr-TransMax-r13            ENUMERATED {
            n4, n8, n16, n32, n64, spare3, spare2, spare1}
    }
}
```

Here, sr-PUCCH-ResourceIndex indicates a PUCCH resource index, which is mapped to a set of a physical resource block index, a cyclic shift value and an orthogonal cover code index. sr-ConfigIndex indicates a transmission time interval between possible SR instants (i.e., a period of PUCCH resource occasions). dsr-TransMax indicates a maximum number of SR transmission (i.e., maximum SR counter).

As shown in Table 1, SR configuration consists of a set of PUCCH resource(s), and each SR PUCCH resource can be configured per a frequency resource/region (e.g., cell). Table 1 shows that two SR PUCCHs can be configured for a primary cell (PCell) and a second cell (SCell), respectively. If there are more than one valid PUCCH resource for SR, the selection of which valid PUCCH resource for SR to signal SR on when the MAC entity has more than one valid PUCCH resource for SR in one TTI is left to UE implementation.

More specifically, SR procedure is performed at the MAC entity of the UE as follows.

When an SR is triggered, it is considered as pending until it is cancelled. All pending SR(s) are cancelled and sr-ProhibitTimer is stopped when a MAC PDU is assembled and this PDU includes a BSR which contains buffer status up to (and including) the last event that triggered the BSR, or when the UL grant(s) can accommodate all pending data available for transmission. If an SR is triggered and there is no other SR pending, the MAC entity sets the SR_COUNTER to 0.

As long as one SR is pending, the MAC entity does for each TTI:
1> if no UL-SCH resources are available for a transmission in this TTI:
  2> if the MAC entity has no valid PUCCH resource for SR configured in any TTI:
    3> initiate a Random Access procedure (see, FIG. 7) and cancel all pending SRs;
  2> else if the MAC entity has at least one valid PUCCH resource for SR configured for this TTI and if this TTI is not part of a measurement gap or Sidelink Discovery Gap for Transmission and if sr-ProhibitTimer is not running:
    3> if SR_COUNTER <dsr-TransMax (=maximum SR counter):
      4> increment SR_COUNTER by 1;
      4> instruct a physical layer to signal the SR on one valid PUCCH resource for SR;
      4> start the sr-ProhibitTimer.
    3> else:
      4> notify RRC to release PUCCH for all serving cells;
      4> notify RRC to release SRS for all serving cells;
      4> clear any configured downlink assignments and uplink grants;
      4> initiate a Random Access procedure (see, FIG. 7) and cancel all pending SRs.

FIG. 7 is a diagram showing a contention-based random access (RA) procedure. The RA procedure is also referred to as a random access channel (RACH) procedure. In the contention-based random access procedure, a UE randomly selects an RACH preamble sequence. Accordingly, a plurality of UE can simultaneously transmit the same RACH preamble sequence, which requires a contention resolution procedure.

Referring to FIG. 7, the contention-based random access procedure includes the following four steps. Messages transmitted in steps 1 to 4 may be respectively referred to as messages (Msgs) 1 to 4. The contention-based random access procedure is initiated by the MAC sublayer of a UE.

Step 1: RACH preamble (via PRACH) (UE=>eNB)
Step 2: Random access response (RAR) (via PDCCH and PDSCH) (eNB=>UE)
Step 3: Layer2/Layer3 message (via PUSCH) (UE=>eNB)
Step 4: Contention resolution message (eNB=>UE)

After transmission of the RACH preamble, the UE attempts to receive a RAR within a time window. Specifically, the UE attempts to detect a PDCCH (hereinafter, RA-RNTI PDCCH) having a RA-RNTI (e.g. CRC in the PDCCH is masked with RA-RNTI) within the time window. The UE checks whether a PDSCH corresponding to the RA-RNTI PDCCH includes a RAR therefor when RA-RNTI PDCCH is detected. The RAR includes timing advance (TA) information representing a timing offset for UL synchronization, UL resource allocation information (UL grant), a temporary UE identifier (e.g. temporary Cell-RNTI (TC-RNTI)), etc. The UE may perform a UL transmission (i.e., Msg3) according to the UL grant and the TA information in the RAR. When the random access procedure is used for uplink resource assignment, Msg3 may include C-RNTI MAC control element (CE), and then eNB may transmit a PDCCH addressed to C-RNTI of the UE, which includes an UL grant for a new transmission as the contention resolution message. The UE may transmit a buffer status report using the UL grant for the new transmission.

Example: Uplink Resource Request

In 3GPP LTE/LTE-A, when an SR is pending, a MAC entity initiates an RA procedure if there is no valid PUCCH for the SR, as explained with referring to FIG. 6.

However, in 3GPP NR, there is a mapping between a logical channel and an SR, in order to distinguish different numerologies/TTI durations (e.g., normal TTI for eMBB, short TTI for URLLC) mapped to logical channels by using SR. This means that an SR triggered by a logical channel is transmitted by using an SR resource associated with the logical channel.

FIG. 8 is an example for a mapping between logical channels and SR resources. Referring to FIG. 8, a UE (in particular, MAC) is configured with 9 LCHs (LCH1-LCH9) with corresponding logical channel priorities (shown as 'p' in the figure) and logical channel group (LCG). And, the UE is configured with 2 SR resources (SR resource 1 and SR resource 2). Each SR resource is configured based on a corresponding SR configuration (refer to, Table 1). In this case the 'p' corresponding to a lower index has a higher priority. For association of logical channels and SR resources, the UE may receive mapping information between LCH and SR resource from a network (e.g., a gNB). Alternatively, the UE may receive mapping information between numerology and SR resource from the network (e.g., gNB), as numerology is also associated with a respective LCH. The same numerology may be associated with more than on LCH. According to the mapping information, the LCH1~LCH6 may be mapped to SR resource 1 (thus, LCH1~LCH6 are called SR group 1), and the LCH7~LCH9 may be mapped to SR resource 2 (thus, LCH7~LCH9 are called SR group 2.

FIG. 8 shows a case that every logical channel is associated with an SR resource. But, it is also possible that a logical channel is associated with an SR resource while the other logical channel is not associated with an SR resource. In this case, when SR is triggered by a logical channel not associated with an SR resource, if the LTE/LTE-A rule is applied, RA will be triggered as explained with referring to FIG. 6. However, if there is any on-going SR transmission on another SR resource, the UE may get an UL grant in response to the ongoing SR transmission. Thus, it is unnecessary to trigger an RA in this case.

In order to address the problem, the present invention proposes: when an SR is triggered due to a logical channel, a UE (in particular, MAC entity) initiates a random access procedure if there is no SR resource associated with the logical channel and if there is no on-going SR transmission on another SR resource which is not associated with the logical channel. Thus, even though there is no SR resource associated with the logical channel, when an SR is triggered due to the logical channel, if there is any on-going SR transmission on another SR resource, the UE does not initiate the random access procedure. Here, SR resource is configured based on a corresponding SR configuration (see, Table 1), and so SR resource can be interchanged with SR configuration. The expression "there is on-going SR transmission on an SR resource" may represent a situation that an SR triggered by a logical channel associated with the SR resource is pending and a total number of SR transmissions on the SR resource does not reach the maximum SR counter (e.g., dsr-TransMax) for the SR resource.

For explanation of the present invention, it is assumed that the UE (in particular, single MAC entity) configures multiple logical channels between a higher layer (e.g., RLC layer) and the MAC entity, and may configure zero, one, or more SR configurations for the MAC entity. As noted in Table 1, an SR configuration consist of a set of PUCCH resource(s) for SR. For a logical channel, at most one PUCCH resource for SR is configured per a frequency resource/region (e.g., cell, bandwidth part (BWP)). Each SR configuration corresponds to one or more logical channels. Each logical channel may be mapped to zero or one SR configuration, which is configured by a higher layer (e.g., RRC). The SR configuration of a logical channel that triggered a regular BSR (if such a SR configuration exists) is considered as a corresponding SR configuration for the triggered SR. For a regular BSR triggered by retxBSR-Timer expiry, the corresponding SR configuration for the triggered SR is that of the highest priority logical channel (if such a SR configuration exists) that has data available for transmission at the time the regular BSR is triggered.

FIG. 9 shows an example for requesting uplink resource in a wireless communication system according to embodiments of the present invention.

Referring to FIG. 9, a UE may configure multiple logical channels (LCHs) for a MAC entity (S902). The UE may also configure zero, one, or more SR configurations for the MAC entity. The multiple LCHs and the configured SR configurations may be mapped like FIG. 8, except that there is at least one LCH not associated with SR configuration (i.e., SR resource). In this situation, the UE may trigger an SR due to LCH # x (S904). For example, a data becomes available in LCH # x, which results in triggering a regular BSR. But, as there is no available UL resource for transmitting the regular BSR, the UE may trigger an SR. When an SR is triggered due to LCH # x, the UE may check whether there is SR resource associated with LCH # x (S906). If there is SR resource associated with LCH # x (S906, yes), the UE may transmit an SR on SR resource associated with LCH # x (S908). But, if there is no SR resource associated with LCH # x (S906, no), the UE may further check whether there is any on-going SR transmission on another SR resource associated with other LCH (S910). If there is any on-going SR transmission on another SR resource associated with other LCH (S910, yes), the UE may cancel the SR triggered by LCH # x without initiating a random access procedure (S912). But, if there is no on-going SR transmission on another SR resource (S910, no), the UE may initiate the random access procedure and cancel all pending SR(s) (S914).

Specifically, SR procedure may be performed at a MAC (entity) of the UE as follows.

1> When an SR is triggered due to a logical channel,
    2> the MAC (entity) checks whether there is an SR resource (or configuration) associated with the logical channel,
        3> if there is an SR resource associated with the logical channel, the MAC (entity) transmits an SR on SR resource associated with the logical channel (see, operations when the MAC entity has at least one valid PUCCH resource for SR in FIG. 6).
        3> if there is no SR resource associated with the logical channel, the MAC (entity) further checks, 4> if there is any on-going SR transmission on other SR resource, which is associated with other logical channel,
  5> if there is any on-going SR transmission on other SR resource,
    6> the MAC (entity) doesn't initiate an RA procedure;
    6> the MAC (entity) cancel the SR triggered by the logical channel;
    6> the MAC (entity) doesn't cancel the SR which is to be transmitted on other SR resource.
4> if there is no on-going SR transmission on other SR resource,
  5> the MAC (entity) initiates an RA procedure (see, FIG. 7);
  5> the MAC (entity) cancels all pending SR(s)

An example is described below:

Step 1. A MAC (entity) is configured with multiple logical channel, where one logical channel (LCH1) is associated with an SR resource while the other logical channel (LCH2) is associated with no SR resource.

Step 2. The MAC (entity) triggers an SR due to LCH1.

Step 3. The MAC (entity) transmits the SR on SR resource associated with LCH1.

Step 4. The MAC (entity) triggers an SR due to LCH2.

Step 5. The MAC (entity) doesn't initiate RA procedure even if there is no SR resource for LCH2 because there is on-going SR transmission due to LCH1.

Another example is described below:

Step 1. A MAC (entity) is configured with multiple logical channel, where one logical channel (LCH1) is associated with an SR resource while the other logical channel (LCH2) is associated with no SR resource.

Step 2. The MAC (entity) triggers an SR due to LCH2.

Step 3. The MAC (entity) checks whether there is SR resource associated with LCH2.

Step 4. As there is no SR resource associated with LCH2, the MAC (entity) further checks if there is any on-going SR transmission on an SR resource.

Step 5. As there is no on-going SR, the MAC (entity) initiates RA procedure.

FIG. 10 is a block diagram of a communication apparatus according to an embodiment of the present invention.

The apparatus shown in FIG. 10 can be a user equipment (UE) and/or eNB (or gNB) adapted to perform the above mechanism, but it can be any apparatus for performing the same operation.

As shown in FIG. 10, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 10 may represent a UE comprising a receiver (135) configured to receive radio signals from a network, and a transmitter (135) configured to transmit radio signals to the network. These receiver and the transmitter can constitute the transceiver (135). This processor (110) is connected to the transceiver (135: receiver and transmitter), and configured to implement the procedures and/or methods proposed by the present invention.

Also, FIG. 10 may represent a network apparatus (e.g., eNB or gNB) comprising a transmitter (135) configured to transmit radio signals to a UE and a receiver (135) configured to receive radio signals from the UE. These transmitter and receiver may constitute the transceiver (135). The network further comprises a processor (110) connected to the transmitter and the receiver. This processor (110) is connected to the transceiver (135: receiver and transmitter), and configured to implement the procedures and/or methods proposed by the present invention.

The embodiments of the present invention described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a user equipment to request uplink resource in a wireless communication system, the method comprising:
   configuring multiple logical channels, wherein each of the multiple logical channels is associated with zero or one scheduling request (SR) resource;
   triggering a SR associated with a first logical channel of the multiple logical channels; and
   based on no SR resource being associated with the first logical channel:
   if there is not any on-going SR transmission, initiating a random access procedure, and
   if there is any on-going SR transmission on a SR resource associated with another logical channel of the multiple logical channels, the any on-going SR transmission is maintained without initiating the random access procedure.

2. The method of claim 1, wherein all pending SR(s) are canceled when the random access procedure is initiated.

3. The method of claim 1, wherein the SR resource includes a physical uplink control channel (PUCCH) resource.

4. A User Equipment (UE) for operating in a wireless communication system, the UE comprising:
   a Radio Frequency (RF) module; and
   a processor operably coupled with the RF module and configured to:
   configure multiple logical channels, wherein each of the multiple logical channels is associated with zero or one scheduling request (SR) resource;
   trigger a SR associated with a first logical channel of the multiple logical channels; and
   based on no SR resource being associated with the first logical channel:
   if there is not any on-going SR transmission initiating a random access procedure, and
   if there is any on-going SR transmission on a SR resource associated with another logical channel of the multiple logical channels, the any on-going SR transmission is maintained without initiating the random access procedure.

5. The UE of claim 4, wherein all pending SR(s) are canceled when the random access procedure is initiated.

6. The UE of claim 4, wherein the SR resource includes a physical uplink control channel (PUCCH) resource.

* * * * *